US012148198B1

(12) United States Patent
Grundhoefer et al.

(10) Patent No.: US 12,148,198 B1
(45) Date of Patent: Nov. 19, 2024

(54) ROBUST BLUR ESTIMATION FOR SHAPES WITH KNOWN STRUCTURAL ELEMENTS

(71) Applicant: Apple Inc., Cupertino, CA (US)

(72) Inventors: Anselm Grundhoefer, Campbell, CA (US); Arun Srivatsan Rangaprasad, Sunnyvale, CA (US); Shubham Agrawal, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 437 days.

(21) Appl. No.: 17/719,553

(22) Filed: Apr. 13, 2022

Related U.S. Application Data

(60) Provisional application No. 63/177,513, filed on Apr. 21, 2021.

(51) Int. Cl.
  *G06V 10/764* (2022.01)
  *G06T 5/70* (2024.01)
  *G06V 10/20* (2022.01)

(52) U.S. Cl.
  CPC .............. *G06V 10/764* (2022.01); *G06T 5/70* (2024.01); *G06V 10/255* (2022.01)

(58) Field of Classification Search
  CPC ....... G06V 10/764; G06V 10/255; G06T 5/70
  See application file for complete search history.

(56) References Cited

U.S. PATENT DOCUMENTS

| 8,249,377 B1* | 8/2012 | Banner ...................... G06T 7/12 |
| | | 382/266 |
| 2009/0110303 A1* | 4/2009 | Nishiyama ............. G06V 10/20 |
| | | 382/260 |
| 2012/0243792 A1* | 9/2012 | Kostyukov ............... G06T 5/73 |
| | | 382/199 |
| 2015/0156419 A1* | 6/2015 | Aggarwal ............. G06T 7/0002 |
| | | 348/208.1 |
| 2017/0357871 A1* | 12/2017 | Zhai ....................... G06V 10/50 |
| 2018/0005343 A1 | 1/2018 | Rhoads et al. |
| 2018/0012411 A1* | 1/2018 | Richey .................. G06T 19/006 |

(Continued)

FOREIGN PATENT DOCUMENTS

| CN | 108305223 A | * | 7/2018 | .......... G06K 9/4604 |
| CN | 109906600 B | * | 7/2021 | ............. G01B 11/24 |

(Continued)

OTHER PUBLICATIONS

Shafi, Rabia, Shuai, Wan; and Younus, Muhammad Usman; "360-Degree Video Streaming: A Survey of the State of the Art", Symmetry 2020, 12, 1491;doi:10.3390/sym12091491; Sep. 10, 2020; pp. 1-31.

*Primary Examiner* — Ted W Barnes
(74) *Attorney, Agent, or Firm* — Thompson Hine LLP

(57) ABSTRACT

Various implementations disclosed herein assess the blurriness of portions of images depicting shapes such as codes or text that have known structural elements. This may involve determining whether a portion of an image of a code or text is sufficiently clear (not blurry) to be accurately interpreted. Blur may be assessed based on spatial frequency of statistical analysis. Blur may be assessed using a machine learning model that is trained using target blur metrics determined based on spatial frequency (e.g., analysis of high frequency portions of discrete cosine transforms of image portions) or statistical analysis (e.g., based on corner/edge detection in image portions).

20 Claims, 8 Drawing Sheets

(56) References Cited

U.S. PATENT DOCUMENTS

| | | | | |
|---|---|---|---|---|
| 2018/0197278 | A1* | 7/2018 | Lee | G06V 10/443 |
| 2018/0300855 | A1* | 10/2018 | Tang | G06T 3/4053 |
| 2019/0318201 | A1* | 10/2019 | Ahmed | G06V 20/653 |
| 2019/0370282 | A1* | 12/2019 | Vergnaud | G06V 10/764 |
| 2020/0145583 | A1* | 5/2020 | Shanmugam | G06V 10/764 |
| 2021/0073945 | A1* | 3/2021 | Kim | G06T 3/4053 |
| 2021/0097650 | A1* | 4/2021 | Kobayashi | G06T 5/70 |
| 2021/0133943 | A1* | 5/2021 | Lee | G06T 5/50 |
| 2021/0319537 | A1* | 10/2021 | Hiasa | G06V 10/751 |

FOREIGN PATENT DOCUMENTS

| | | | | |
|---|---|---|---|---|
| CN | 111476056 B | * | 4/2024 | G06F 18/214 |
| JP | 7220062 B2 | * | 2/2023 | G06K 9/3233 |
| WO | WO-2014169162 A1 | * | 10/2014 | G06K 9/62 |
| WO | WO-2018176017 A1 | * | 9/2018 | G06F 18/2178 |

* cited by examiner

700

```
┌─────────────────────────────────────────────┐
│   Obtain an image of a physical environment │──710
└─────────────────────────────────────────────┘
                      │
                      ▼
┌─────────────────────────────────────────────┐
│      Determine a portion of the image       │──720
│              having a shape                 │
└─────────────────────────────────────────────┘
                      │
                      ▼
┌─────────────────────────────────────────────┐
│ Assess blur of the portion of the image using a machine │
│ learning model, where the machine learning model is    │──730
│ trained using target blur metrics determined based on  │
│              spatial frequency              │
└─────────────────────────────────────────────┘
                      │
                      ▼
┌─────────────────────────────────────────────┐
│ In accordance with assessing the blur of the portion of │
│ the image, interpret the portion of the image to decode │──740
│            or recognize the shape           │
└─────────────────────────────────────────────┘
```

```
┌─────────────────────────────────────────┐
│  Obtain an image of a physical environment  │─ 810
└─────────────────────────────────────────┘
                    ↓
┌─────────────────────────────────────────┐
│     Determine a portion of the image        │─ 820
│             having a shape                  │
└─────────────────────────────────────────┘
                    ↓
┌─────────────────────────────────────────┐
│ Assess blur of the portion of the image using a machine │
│ learning model, where the machine learning model is     │─ 830
│ trained using target blur metrics determined based on   │
│                statistical analysis                     │
└─────────────────────────────────────────┘
                    ↓
┌─────────────────────────────────────────┐
│ In accordance with assessing the blur of the portion of │
│ the image, interpret the portion of the image to decode │─ 840
│              or recognize the shape                     │
└─────────────────────────────────────────┘
```

FIG. 8

ROBUST BLUR ESTIMATION FOR SHAPES WITH KNOWN STRUCTURAL ELEMENTS

CROSS-REFERENCE TO RELATED APPLICATIONS

This application claims the benefit of U.S. Provisional Application Ser. No. 63/177,513 filed Apr. 21, 2021, which is incorporated herein in its entirety.

TECHNICAL FIELD

The present disclosure generally relates to estimating image blur and to systems, methods, and devices that estimate image blur to facilitate the interpretation of shapes such as codes and text in images of physical environments.

BACKGROUND

Interpreting shapes such as codes and text can depend upon the blurriness of the images in which the shapes are depicted. Blurriness may result from a variety of factors including, but not limited to, distance from the image sensor, motion of the image sensor or physical environment, and/or the image sensor not being focused on the shape within the physical environment. Existing techniques for estimating blurriness in processes that interpret shapes in images may not be sufficiently accurate or efficient.

SUMMARY

Various implementations disclosed herein assess the blurriness of portions of images depicting shapes, such as codes or text, that have known structural elements. Assessing blur may involve determining a blur value that is specifically tailored to be indicative of blur that will affect the interpretability of a shape of a set of shapes having common structural characteristics but different attributes or colors. Assessing blur may involve determining whether a portion of an image of a code or text is sufficiently clear (not blurry) to be accurately interpreted. Blur may be assessed based on spatial frequency or statistical analysis.

In one exemplary implementation, a processor executes instructions stored in a computer-readable medium to perform a method. The method obtains an image of a physical environment; (e.g., via an image sensor) and determines a portion of the image having a shape, where the shape is one of a plurality of shapes having common structural characteristics (e.g., a code or text that differs from other codes and text with respect to certain attributes and/or color combinations). The method assesses blur (e.g., whether the image is clear or not) of the portion of the image by determining a blur value corresponding to the interpretability of the shape in the image. The method, in accordance with assessing the blur of the portion of the image, interprets the portion of the image to interpret the shape, for example, by recognizing text or decoding a code.

Blur may be assessed using a machine learning model that is trained using target blur metrics determined based on spatial frequency (e.g., analysis of spatial frequencies in the frequency domain using, for example, the discrete cosine or Fourier transforms of image portions) or statistical analysis (e.g., based on corner/edge detection in image portions).

A machine learning model may be trained by processes that take into account knowledge that the shapes, such as codes or text, that are to be interpreted have known structural elements, while also having some variations. A code, for example, may have lines or arcs having certain shapes characteristics according to a code format, but may also having variable size code elements and/or use different color combinations. As another example, text may include a variety of letters having similar characteristics based on the nature of text, but may have variability in font, size, and color. Such known structural characteristics and variabilities can be accounting for in training a machine learning model to assess the blurriness of an image with respect to the purpose of interpreting shapes having those structural characteristics and variabilities.

In some implementations, a machine learning model may be trained using target blur metrics that assess blur based on the spatial frequencies that are most indicative of the blurriness of an image of something having the known structural characteristics and variabilities. In some implementations, a processor of an electronic device executes instructions stored in a non-transitory computer-readable medium to perform a method. The method obtains an image of a physical environment and determines a portion of the image having a code or text. The method assesses a blur (e.g., whether the imaged content in the photo is captured as crisp as expected or not) of the portion of the image using a machine learning model, where the machine learning model is trained using target blur metrics determined based on spatial frequency. For example, a target/ground truth blur metric for each training image may be determined by comparing a discrete cosine transform (DCT) spatial high frequency confidence of an image portion without blur to a DCT spatial high frequency confidence of the image portion with blur. The method, in accordance with assessing the blur of the portion of the image, interprets the portion of the image to decode the code or recognize the text. For example, the method may only interpret the portion of the image if the machine learning model determines a particular classification (e.g., not blurred) or if image has an assessed numerical blur value that is below a threshold value.

In some implementations, a machine learning model may be trained using target blur metrics that assess blur based on statistical analysis (e.g., of corners and edges) of image characteristics that are most indicative of the blurriness of an image of something having the known structural characteristics and variabilities. In some implementations, a processor of an electronic device executes instructions stored in a non-transitory computer-readable medium to perform a method. The method obtains an image of a physical environment and determines a portion of the image comprising a code or text. The method assesses a blur (e.g., whether the image is clear or not) of the portion of the image using a machine learning model, where the machine learning model is trained using target blur metrics determined based on statistical analysis. For example, a target/ground truth blur metric for each training image may be determined by comparing a transform corresponding to edge or corner detection (e.g., Laplacian edge detection) of the training image without blur to a transform corresponding to edge or corner detection of the training image with blur. The method, in accordance with assessing the blur of the image portion, interprets the portion of the image to decode the code or recognize the text. For example, method may only interpret the portion of the image if the machine learning model determines a particular classification (e.g., not blurred) or a blur value below a threshold value.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory, computer-readable storage medium stores instructions, which, when executed by one or more processors of a device, cause the device to perform or cause performance of any of the methods described herein. In accordance with some implementations, a device includes one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 7 is a flowchart illustrating an exemplary method assessing the blur of a portion of an image of a physical environment in accordance with some implementations.

FIG. 8 is a flowchart illustrating another exemplary method assessing the blur of a portion of an image of a physical environment in accordance with some implementations.

Figure 1:
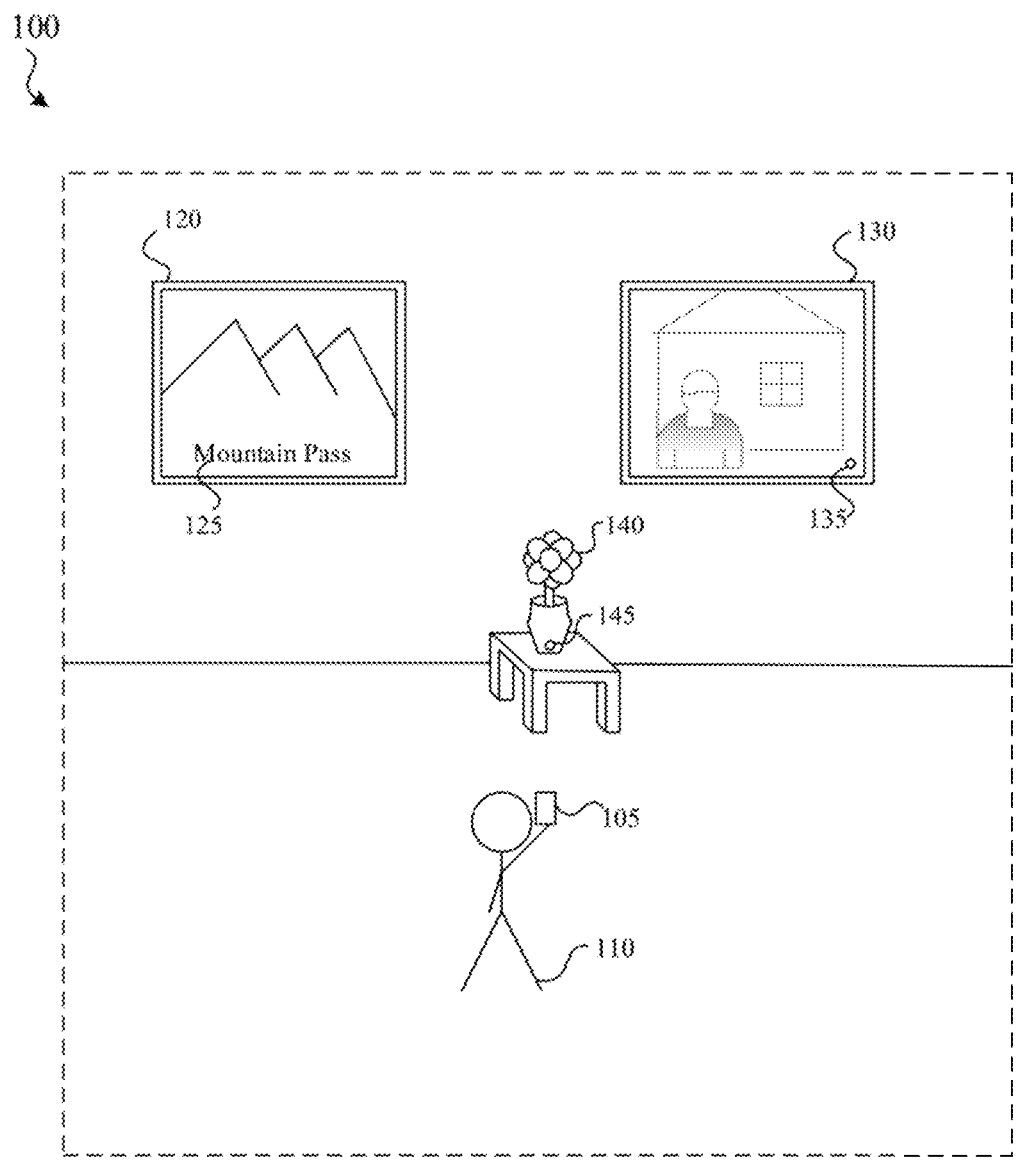
FIG. 1 illustrates an example of an electronic device used within a physical environment in accordance with some implementations.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example of an electronic device 105 used by a user 110 within a physical environment 100. A physical environment refers to a physical world that people can interact with and/or sense without the aid of electronic systems. Physical environments, such as a physical park, include physical articles, such as physical trees, physical buildings, and physical people. People can directly sense and/or interact with the physical environment, such as through sight, touch, hearing, taste, and smell.

In the example of FIG. 1, the device 105 is illustrated as a single device. Some implementations of the device 105 are hand-held. For example, the device 105 may be a mobile phone, a tablet, a laptop, and so forth. In some implementations, the device 105 is worn by a user. For example, the device 105 may be a watch, a head-mounted device (HMD), and so forth. In some implementations, functions of the device 105 are accomplished via two or more devices, for example additionally including an optional base station. Other examples include a laptop, desktop, server, or other such devices that includes additional capabilities in terms of power, CPU capabilities, GPU capabilities, storage capabilities, memory capabilities, and the like. The multiple devices that may be used to accomplish the functions of the device 105 may communicate with one another via wired or wireless communications.

In FIG. 1, the physical environment 100 includes two wall hangings 120, 130 and a flower in a vase 140. The first wall hanging 120 includes text 125, the second wall hanging 130 includes a code 135 (e.g., a barcode or other visual marker), and the flower in the vase 140 includes a code 145 (e.g., a barcode or other visual marker). In some implementations, the electronic device 105 is configured to capture images and interpret the images to identify shapes such as those of text 125 and codes 135, 145. In some implementations, the electronic device 105 captures one or more images of the physical environment 100, including one or more of the text 125 or codes 135, 145. The electronic device 105 may identify the shapes in one or more images and interpret the corresponding portions of the one or more images, e.g., to recognize the text 125 or decode data encoded in the codes 135, 145.

Figure 2:
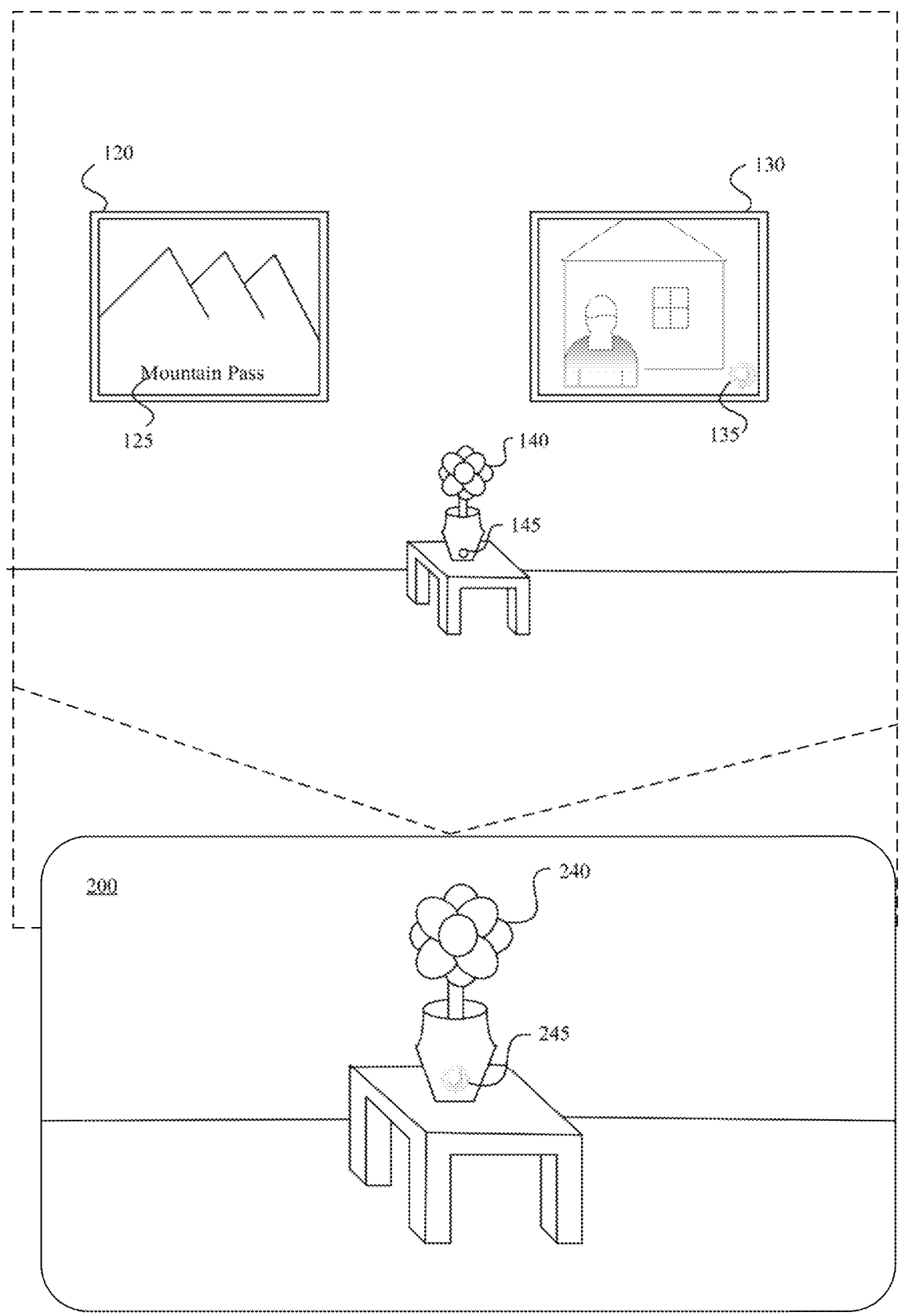
FIG. 2 illustrates an example of the electronic device acquiring an image in the physical environment of FIG. 1 in accordance with some implementations.

FIG. 2 illustrates an example of the electronic device 105 acquiring an image in the physical environment 100. In this example, the image 200, which is shown as displayed on electronic device 105, includes a depiction 240 of the flower in the vase 140 and a depiction 245 of the code 145. In other implementations, an image such as image 200 is captured and assessed, but not displayed on the electronic device 200. The image 200 may be evaluated to identify that a portion of the image 200 (e.g., a patch or region of pixels) depicts the code 145. This portion of the image is evaluated to assess its blurriness with respect to the purpose of interpreting shapes having certain structural characteristics and variabilities, e.g., the structural characteristics and variabilities of codes of a particular type or format. Such blurriness is assessed using one or more of the techniques disclosed herein, for example, using a machine learning model. In one example, the machine learning model is trained to do so using target blur metrics that assess blur based on the spatial frequencies that are most indicative of the blurriness of an image of something having the known structural characteristics and variabilities. Such frequencies may be the prevalent or dominant frequencies in the shape structure that are determined to diminish with increasing blur. In another example, the machine learning model may be trained using target blur metrics that assess blur based on statistical analysis (e.g., of corners and edges) of image characteristics that are most indicative of the blurriness of an image of something having the known structural characteristics and variabilities.

Figure 3:
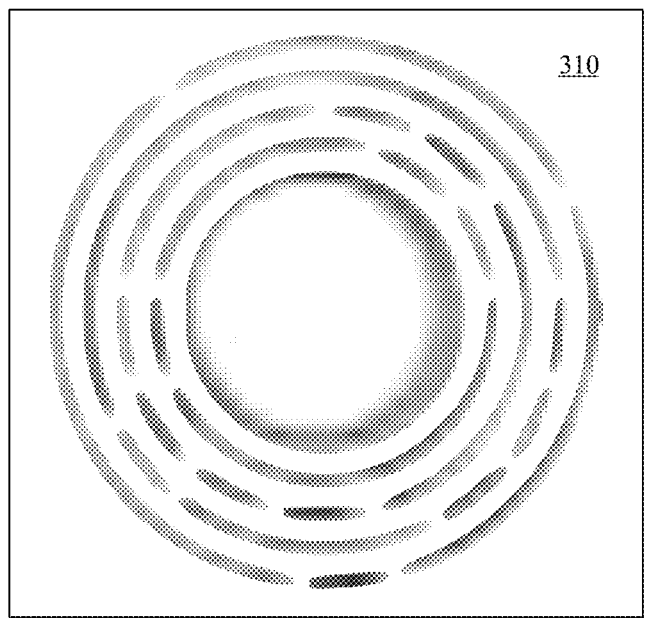
FIG. 3 illustrates an example of relatively crisp portion of an image acquired by the electronic device that depicts a visual marker in accordance with some implementations.
Figure 4:
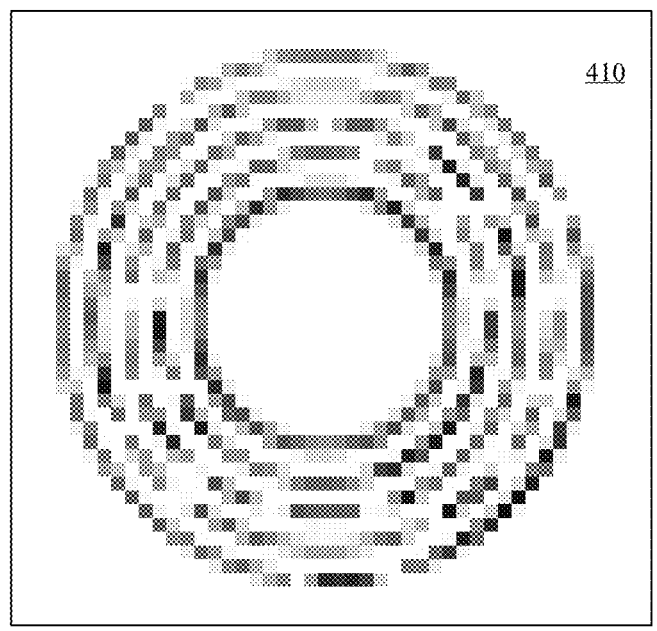
FIG. 4 illustrates an example of relatively blurry portion of an image acquired by the electronic device that depicts a visual marker in accordance with some implementations.

FIG. 3 illustrates an example of relatively crisp portion of an image acquired by the electronic device 105 with a depiction 310 of an exemplary code. In contrast, FIG. 4 illustrates an example of relatively blurry portion of an image acquired by the electronic device 105 that depicts a depiction 410 of the same exemplary code. In these examples, the exemplary code is a visual marker that includes markings arranged to form a shape (e.g., arcs forming rings). Each ring may define a template (e.g., grid) of arcs and gaps used to convey information in the visual marker. The template may be selectively filled with sub-markings (e.g., representing a "1" bit) or left as gaps (e.g., representing a "0" bit) to convey information. Visual markers using such an encoding format may have similar structural characteristics (e.g., having similar ring, arc, and gap characteristics) while also being variable (e.g., having differing numbers and placements of arcs and gaps and/or different color usage for background and arc colors).

In some implementations, a machine learning model is trained to assess the blurriness of an image using training data that is specific to the type/format of shapes (e.g., codes or text) that will be interpreted from the image. Such training may use sample images of shapes of the shape type/format that share the common structural characteristics of the type/format of the shape and/or that differ with respect to variable aspects of the type/format of shape. For example, training data may include images of codes that use the same format as the exemplary code depicted in FIGS. 3 and 4 with similarly shaped rings, with different numbers of arcs and gaps and different positions of arcs and gaps corresponding to different data encodings and/or in different color combinations. Using such training data may provide a machine learning model that is able to more accurately and/or more efficiently assess the blurriness of an image with respect to the purpose of interpreting shapes of a given type or format having those structural characteristics and variabilities.

Figure 5:
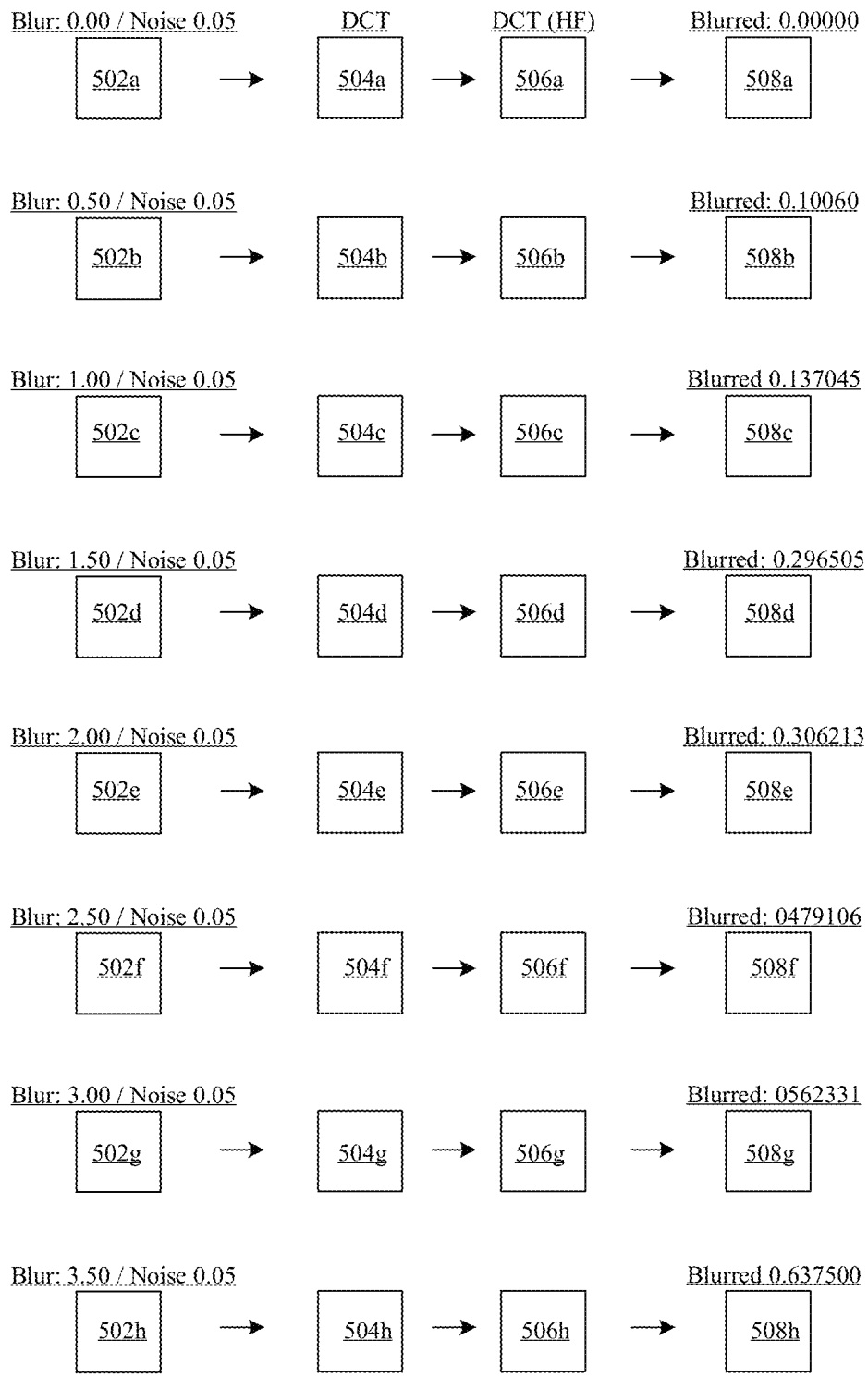
FIG. 5 illustrates examples of using high frequency portions of spatial frequency representations of different versions of an image to generate blur values corresponding to the different versions of the image in accordance with some implementations.
Figure 6:
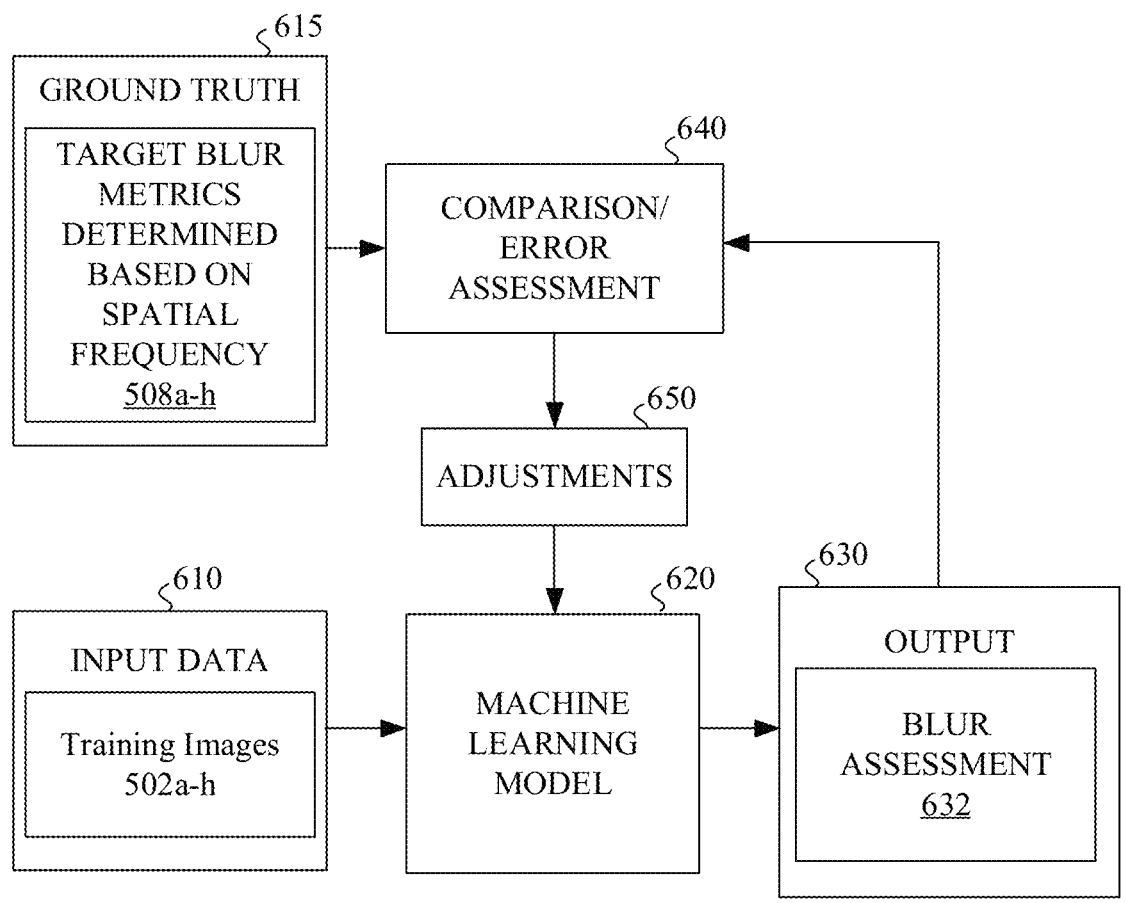
FIG. 6 illustrates an example training process in which generated blur estimates are used as ground truth to train a machine learning model to output blur estimates for input images in accordance with some implementations.

In some implementations, a machine learning model is trained to assess the blurriness of an image using training data that includes target blur metrics (e.g., ground truth blur values) that assess blur based on the spatial frequencies that are most indicative of the blurriness of an image of something having the known structural characteristics and variabilities. FIGS. 5-6 illustrate an example of generating target blur metrics and using those metrics in training a machine learning model to assess the blurriness of an image.

FIG. 5 illustrates target blur metrics (e.g., ground truth blur values) generated for different versions 502a-h of an image (e.g., an image portion depicting a shape). In this example, different amounts of blur are applied to an image of a shape (e.g., a relatively clear image of a code such as is depicted in FIG. 3). Blur may be generated via low pass filtering, convolution of an image with a filter (e.g., box or Guassian), blurring using large or small blur kernels, or other any other blurring technique or combination of techniques. In this example, Gaussian blur is added in differing amounts in the various versions of the image. Version 502a has no blur added, version 502b has blur added using blur value 0.5, version 502c has blur added using blur value 1.0, version 502d has blur added using blur value 1.5, version 502e has blur added using blur value 2.0, version 502f has blur added using blur value 2.5, version 502g has blur added using blur value 3.0, and version 502h has blur added using blur value 3.5. In alternative examples, additional or alternative techniques may be used to generate or otherwise simulate blur that may occur based on distance between a shape and an image sensor, motion of the image sensor or the shape, and/or the image sensor not being focused on the shape within the physical environment. Blur may be generated via a technique that simulates directional/movement blurs, e.g., using a blur kernel of limited height (e.g., 1 pixel) to simulate horizontal motion blur, using a blur kernel of limited width (e.g., 1 pixel) to simulate vertical motion blur, etc. In some implementations, different types of blur are applied to different images to simulate different real-world sources of blur, e.g., some images with horizontal motion blur, some images with vertical motion blur, some images with diagonal motion blur, some images with blur caused by movement to the left, some images with blur caused by movement to the right, etc.

Spatial frequency representations are determined for each of these versions 502a-h of the image. In this example, a discrete cosine transform (DCT) 504a-h is generated each of these versions 502a-h of the image.

In this example, spatial frequency bands of the image 506a-h are generated using the discrete cosine transforms (DCT) 504a-h and the high frequency components are evaluated to determine target blur metrics 508a-h corresponding to each of the versions 502a-h of the image, respectively. The target blur metrics 508a-h, for example, may be determined by comparing a DCT high frequency components of an image portion without blur to a DCT high frequency components of the image portion with blur. In this example, the high frequency portion each of the spatial frequency representation (e.g., the DCT) is used because changes in the high frequency portion correspond to blurring that is likely to negatively affect the desired ability to interpret shapes having the known structural characteristics and variabilities of this example. In some implementations, for example, involving text or codes having different formats and structures, a different portion or potions (e.g. a middle frequency range, varying orientations, etc.) of the spatial frequency representations is/are used to determine the target blur metrics based on the known structural characteristics and variabilities of the shapes that will be interpreted.

The process illustrated in FIG. 5 may be repeated for additional images of shapes of a particular type (e.g., other exemplary codes having the same format). Accordingly, target blur metrics for various levels of blur for many training images of shapes of a given type/format that share (and thus represent) known structural characteristics but that have differing aspects (e.g., variabilities of color, etc.) may be created.

FIG. 6 illustrates an example training process in which generated blur estimates (e.g., target blur metrics 508a-h of FIG. 5) are used as ground truth to train a machine learning model to output blur estimates for input images. In this example, training images 502a-h are used as training input data 610 to machine learning model 620. For each training image, the machine learning model 620 produces output 630 including a blur assessment 632, e.g., a classification such as blurred or not blurred or a numerical prediction on a scale from, e.g. 0-10 of a level of blur. The training process uses the output 630 and ground truth training data 615, e.g., the target blur metrics 508a-h from FIG. 5, to determine an adjustment 650 to the machine learning model 620. During the course of training over multiple iteration using images of shapes of a particular type (e.g., exemplary codes having the same format) but variations and corresponding target blur metrics determined based on spatial frequency, the machine learning model 620 is adjusted (and thus learns) to accurately and efficiently produce blur assessments 632 using images of shapes, e.g., such as image portion 310 or image portion 410 of FIGS. 3 and 4 respectively. Because the training data was based on spatial frequency, the machine learning model is effectively trained in a way that takes into account spatial frequency and thus accounts for the known structural characteristics and variabilities of the shapes that will be interpreted based on the machine learning models blur assessment 632.

FIG. 7 is a flowchart illustrating an exemplary method of assessing the blur of a portion of an image of a physical environment. In some implementations, the method 700 is performed by a device (e.g., electronic device 105 of FIG. 1). The method 700 can be performed using an electronic device or by multiple devices in communication with one another. In some implementations, the method 700 is performed by processing logic, including hardware, firmware, software, or a combination thereof. In some implementations, the method 700 is performed by a processor executing code stored in a non-transitory computer-readable medium (e.g., a memory).

At block 710, the method 700 obtains an image of a physical environment. An image sensor at an electronic device captures the image of the physical environment. In some implementations, the sensor can be an RGB camera, a depth sensor, an RGB-D camera, a monochrome camera, a 2D camera, an IR camera, and/or the any other sensor providing data used to generate an image (or data which allows to generate an image) of a physical environment. In some implementations, combinations of sensors are used. In some implementations, the image is color. In some implementations the image is grayscale.

At block 720, the method 700 determines a portion of the image comprising a shape (e.g., a code or text). The shape the shape may be one of a plurality of shapes having common structural characteristics. The determining may involve determining that the obtained image includes a depiction of a shape, e.g., text or a code. For example, such a shape may be visible on a surface of an object in the physical environment. The shape may include text of single or variable font. The shape may include a one-dimensional (1D) code, a two-dimensional (2D) code, or a (3D) three-dimensional code. The shape may be printed on the surface of the object (e.g., in black and white or color), colored etched, painted, powdered, drawn, sprayed, or the like onto the surface of the object, displayed by a display, or projected by a projector on the object in the physical environment. In some implementations, an electronic device (e.g., including the image sensor) detects the shape (e.g., text or code) in the image of the physical environment using an algorithm or machine learning model. In some implementations, the shape is detected based on identifying a pattern, outline, pixel combination, or characteristic(s) of a selected portion of the image. Based on identifying the shape within the image, a portion of the image (e.g., a subset of some or all of the pixels of the image) are selected for further analysis.

At block 730, the method 700 assesses blur of the portion of the image using a machine learning model, where the machine learning model is trained to assess blur using target blur metrics determined based on spatial frequency. Assessing the blur of the portion of the image may involve assessing whether the image is sufficiently clear or not for an intended purpose, e.g., for interpreting the shape with a desired degree of accuracy. Assessing the blur may involve determining a level of blur (e.g., on a numerical scale) that can be compared against a threshold or other criteria to determine whether the image is sufficiently clear or not for an intended purpose, e.g., for interpreting the shape with a desired degree of accuracy.

The machine learning model may be trained using images depicting a plurality of shapes having common structural characteristics.

The machine learning model may be trained using a target blur metric for each of a plurality of training images of codes or text, e.g., of codes or text have different shapes and/or different color combinations. The machine learning model may be trained using a target blur metrics as ground truth for each of multiple training image. The target blur metrics for the training images may be determined based on evaluating spatial frequencies of blurred and cleared versions of a training image. The target blur metric for each of the plurality of training images may be determined by comparing a spatial frequency range confidence of a clear version of each training image with the spatial frequency range confidence of a blurred version of each training image. For example, this may involve comparing a DCT high frequency components of an image portion without blur to a DCT high frequency components of the image portion with blur.

In some implementations, the machine learning model is trained by obtaining a clear version of a training image and generating a blurred version of the training image using image processing operations, as, for example, a Gaussian blur filter operator. The training further involves filtering spatial frequencies of the clear version and blurred version of the training image, where the filtering is based on generating DCTs that transform the clear version and the blurred version of the training image from the spatial domain to the frequency domain. The training further involves determining the target blur metric based on the filtered spatial frequencies of the clear version and the blurred version of the training image. The machine learning model is trained to predict a blur score using the blurred version of the training image as training input, where a ground truth of the training is based on the determined target blur metric. In some implementations, image processing operations such as Laplacian can be applied to find edges and corners and a statistical operation such as variance can be used to identify if the image is crisp or blurred. The variance can be used for instance as a blur metric to train the machine learning model.

In some implementations, the machine learning model a neural network (e.g., an artificial neural network), decision tree, support vector machine, Bayesian network, or the like.

At block 740, the method 700, in accordance with assessing the blur of the portion of the image, interprets the portion of the image to decode or recognize the shape. For example, this may involve determining whether to interpret the portion of the image if the ML model determines a particular classification (e.g., not blurred) or a blur value below a threshold value. In live image capture scenario in which a stream of live images of an environment are obtained, each image may be assessed with respect to blur as (e.g., on an ongoing basis) as the respective image is received. If a shape is detected in an image and the image is sufficiently clear, the shape is interpreted. If a shape is detected in an image and the image is too blurry for interpretation, then the device can wait and evaluate the next obtained image in the same way. In such an implementation, the device is able to interpret the shape at the earliest appropriate opportunity, e.g., as soon as an image is received having adequate blur/clarity characteristics for interpretation. Doing so may thus provide a desirable balance of ensuring accurate and fast detection and interpretation of shapes (e.g., text and codes) within a physical environment as well as to minimize overall power consumption since potential complex processing steps can be potentially omitted if the image is estimated as too blurry for further processing. In an alternative implementation, blur is assessed for a set of images and the image having the best clarity (e.g., the least blur) for interpretation is selected for interpretation. Such an implementation may prioritize accuracy over fast detection and interpretation.

FIG. 8 is a flowchart illustrating an exemplary method of assessing the blur of a portion of an image of a physical environment. In some implementations, the method 800 is performed by a device (e.g., electronic device 105 of FIG. 1). The method 800 can be performed using an electronic device or by multiple devices in communication with one another. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 obtains an image of a physical environment. An image sensor at an electronic device captures the image of the physical environment. In some implementations, the sensor can be an RGB camera, a depth sensor, an RGB-D camera, a monochrome camera, a 2D camera, an IR camera, and/or the any other sensor providing data used to generate an image of a physical environment. In some implementations, combinations of sensors are used. In some implementations, the image is color. In some implementations the image is grayscale.

At block 820, the method 800 determines a portion of the image comprising a shape (e.g., a code or text). The shape the shape may be one of a plurality of shapes having common structural characteristics. The determining may involve determining that the obtained image includes a depiction of a shape, e.g., text or a code. For example, such a shape may be visible on a surface of an object in the physical environment. The shape may include text of single or variable font. The shape may include a one-dimensional (1D) code, a two-dimensional (2D) code, or a (3D) three-dimensional code. The shape may printed on the surface of the object (e.g., in black and white or color), colored etched, painted, powdered, drawn, sprayed, or the like onto the surface of the object, displayed by a display, or projected by a projector on the object in the physical environment. In some implementations, an electronic device (e.g., including the image sensor) detects the shape (e.g., text or code) in the image of the physical environment using an algorithm or machine learning model. In some implementations, the shape is detected based on identifying a pattern, outline, pixel combination, or characteristic(s) of a selected portion of the image. Based on identifying the shape within the image, a portion of the image (e.g., a subset of some or all of the pixels of the image) are selected for further analysis.

At block 830, the method 800 assesses blur of the portion of the image using a machine learning model, where the machine learning model is trained using target blur metrics determined based on statistical analysis. Assessing the blur of the portion of the image may involve assessing whether the image is sufficiently clear or not for an intended purpose, e.g., for interpreting the shape with a desired degree of accuracy. Assessing the blur may involve determining a level of blur (e.g., on a numerical scale) that can be compared against a threshold or other criteria to determine whether the image is sufficiently clear or not for an intended purpose, e.g., for interpreting the shape with a desired degree of accuracy.

The machine learning model may be trained using images depicting a plurality of shapes having common structural characteristics.

The target blur metrics used to train the machine learning model may be determined by comparing a transform corresponding to edge or corner detection (e.g., Laplacian edge detection) of a training image without blur to a transform corresponding to edge or corner detection of the training image with blur. Thus, the target blur metric for each of the plurality of training images may be determined by comparing a first transform corresponding to edge or corner detection of a clear version of a respective training image to a second transform corresponding to edge or corner detection of a blurred version of the respective training image. The target blur metric for each of the plurality of training images may be determined using a Laplacian. When using a Laplacian, a reference image may or may not be used. The Laplacian may highlight regions of an image containing rapid intensity changes, such as corners and edges. Performing a statistical analysis such as variance may provide an estimate for how prevalent the edges/corners are. A high variance indicates a crisp image, while a low variance indicates a blurred image. This is because generally if an image contains high variance then there is a wide spread of edge-like and non-edge like regions. On the other hand, if there is very low variance, then generally there is only a small number of edges in the image. Comparing the variance of a crisp image with its blurred counterpart can provide a relative metric of blurriness. In some implementations, the machine learning model is a neural network (e.g., an artificial neural network), decision tree, support vector machine, Bayesian network, or the like.

At block 840, the method 800, in accordance with assessing the blur of the portion of the image, interprets the portion of the image to decode or recognize the shape. For example, this may involve determining whether to interpret the portion of the image if the ML model determines a particular classification (e.g., not blurred) or a blur value below a threshold value. In live image capture scenario in which a stream of live images of an environment are obtained, each image may be assessed with respect to blur as (e.g., on an ongoing basis) as the respective image is received. If a shape is detected in an image and the image is sufficiently clear, the shape is interpreted. If a shape is detected in an image and the image is too blurry for interpretation, then the device can wait and evaluate the next obtained image in the same way. In such an implementation, the device is able to interpret the shape at the earliest appropriate opportunity, e.g., as soon as an image is received having adequate blur/clarity characteristics for interpretation. Doing so may thus provide a desirable balance of ensuring accurate and fast detection and interpretation of shapes (e.g., text and codes) within a physical environment. In an alternative implementation, blur is assessed for a set of images and the image having the best clarity (e.g., the least blur) for interpretation is selected for interpretation. Such an implementation may prioritize accuracy over fast detection and interpretation.

Figure 9:
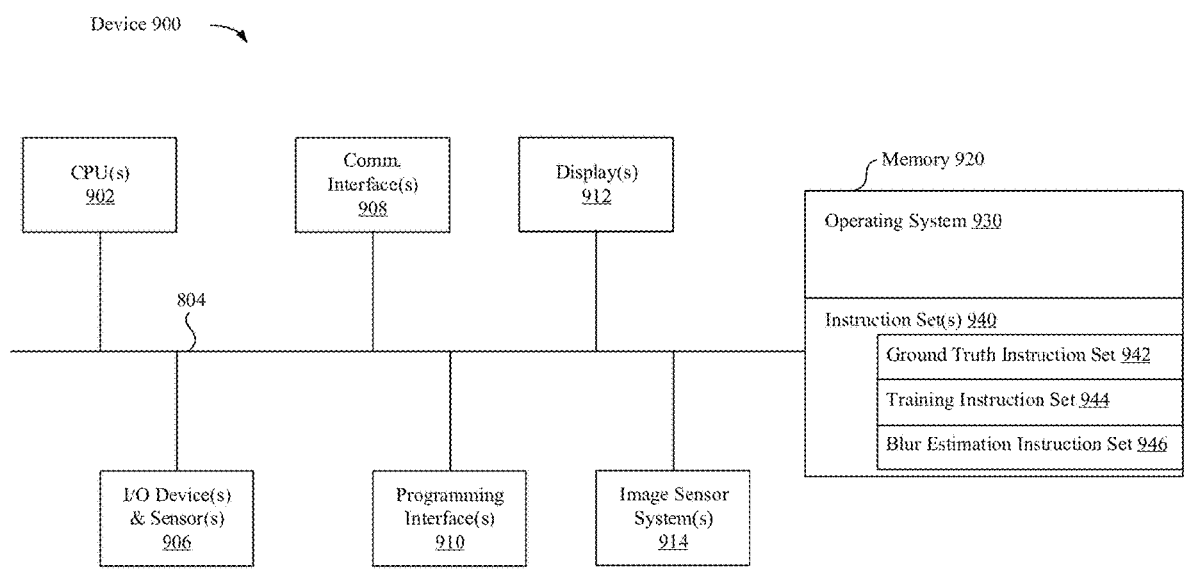
FIG. 9 illustrates an exemplary device configured in accordance with some implementations.

FIG. 9 is a block diagram illustrating exemplary components of the device 105 configured in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 105 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 910, one or more displays 912, one or more interior and/or exterior facing image sensor systems 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 912 are configured to present a view of a physical environment or a graphical environment (e.g. a 3D environment) to the user. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 912 correspond to diffractive, reflective, polarized, holographic, etc. waveguide displays. In one example, the device 105 includes a single display. In another example, the device 105 includes a display for each eye of the user.

In some implementations, the one or more image sensor systems 914 are configured to obtain image data that corresponds to at least a portion of the physical environment 100. For example, the one or more image sensor systems 914 include one or more RGB cameras (e.g., with a complimentary metal-oxide-semiconductor (CMOS) image sensor or a charge-coupled device (CCD) image sensor), monochrome cameras, IR cameras, depth cameras, and/or the like. In various implementations, the one or more image sensor systems 914 further include illumination sources that emit light, such as a flash. In various implementations, the one or more image sensor systems 914 further include an on-camera image signal processor (ISP) configured to execute a plurality of processing operations on the image data.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 includes a non-transitory computer readable storage medium.

In some implementations, the memory 920 or the non-transitory computer readable storage medium of the memory 920 stores an optional operating system 930 and one or more instruction set(s) 940. The operating system 930 includes procedures for handling various basic system services and for performing hardware dependent tasks. In some implementations, the instruction set(s) 940 include executable software defined by binary information stored in the form of electrical charge. In some implementations, the instruction set(s) 940 are software that is executable by the one or more processing units 902 to carry out one or more of the techniques described herein.

The instruction set(s) 940 include a ground truth instruction set 942, a training instruction set 944, and a blur estimation instruction set 946. The instruction set(s) 940 may be embodied a single software executable or multiple software executables.

In some implementations, the ground truth instruction set 942 is executable by the processing unit(s) 902 (e.g. a CPU) to generate training images (e.g., clear and blurred versions of an image of a shape) and/or target blur metrics associated with those training images as disclosed herein. To these ends, in various implementations, it includes instructions and/or logic therefor, and heuristics and metadata therefor.

In some implementations, the training instruction set 944 is executable by the processing unit(s) 902 (e.g., a CPU) to train a machine learning model, for example, using the ground truth data produced via execution of ground truth instruction set 942, as discussed herein. To these ends, in various implementations, it includes instructions and/or logic therefor, and heuristics and metadata therefor.

In some implementations, the blur estimation instruction set 946 is executable by the processing unit(s) 902 (e.g., a CPU) to generate a blur assessment, for example, using a machine learning model trained by execution of training instruction set 944, as discussed herein. To these ends, in various implementations, it includes instructions and/or logic therefor, and heuristics and metadata therefor.

Although the instruction set(s) 940 are shown as residing on a single device, it should be understood that in other implementations, any combination of the elements may be located in separate computing devices. Moreover, FIG. 9 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
    at an electronic device:
        obtaining an image of a physical environment;
        determining a portion of the image comprising a shape, wherein the shape is one of a plurality of shapes having common structural characteristics;
        assessing a blur of the portion of the image, wherein assessing the blur comprises determining a blur value corresponding to the interpretability of the shape in the image;
        and
        in accordance with assessing the blur of the portion of the image, interpreting the portion of the image to interpret the shape.

2. The method of claim 1, wherein blur of the image is assessed using a machine learning model, wherein the machine learning model is trained to assess blur of images depicting the plurality of shapes using target blur metrics determined based on spatial frequency.

3. The method of claim 2, wherein the machine learning model is trained using a target blur metric for each of a plurality of training images of shapes.

4. The method of claim 3, wherein the target blur metric for each of the plurality of training images is determined by comparing a spatial frequency range components of a clear version of each training image with the spatial frequency range components of a blurred version of each training image.

5. The method of claim 3, wherein the target blur metric for each of the plurality of training images is determined by comparing a transform high frequency component of a clear version of each training image with a transform high frequency component of a blurred version of each training image.

6. The method of claim 3, wherein the machine learning model is trained by:
    obtaining a clear version of a training image;
    generating a blurred version of the training image using an image processing operator;
    filtering spatial frequencies of the clear version and blurred version of the training image, wherein the filtering is based on performing transforms to transform the clear version and the blurred version of the training image from spatial domain to frequency domain;
    determining the target blur metric based on the filtered spatial frequencies of the clear version and the blurred version of the training image; and
    training the machine learning model to predict a blur score using the blurred version of the training image as training input, wherein a ground truth of the training is based on the determined target blur metric.

7. The method of claim 3, wherein the plurality of training images depict different shapes.

8. The method of claim 3, wherein the plurality of training images depict different color combinations.

9. The method of claim 1, wherein blur of the image is assessed using a machine learning model, wherein the machine learning model is trained to assess blur of images depicting the plurality of shapes using target blur metrics determined based on statistical analysis.

10. The method of claim 9, wherein the machine learning model is trained using a target blur metric for each of a plurality of training images of shapes.

11. The method of claim 10, wherein the target blur metric for each of the plurality of training images is determined by comparing a first transform corresponding to edge or corner detection of a clear version of a respective training image to a second transform corresponding to edge or corner detection of a blurred version of the respective training image.

12. The method of claim 10, wherein the target blur metric for each of the plurality of training images is determined by:
generating the first transform by determining a Laplacian of the clear version of the respective training image; and
generating the second transform by determining a Laplacian of the blurred version of the respective training image.

13. The method of claim 9, wherein the plurality of training images depict different shapes.

14. The method of claim 9, wherein the plurality of training images depict different color combinations.

15. The method of claim 1, wherein assessing the blur comprises determining a classification of the portion of the image.

16. The method of claim 1, wherein the portion of the image is interpreted based on determining that the portion of the image is sufficiently clear based on the assessing of the blur.

17. The method of claim 1, wherein the shape comprises a two-dimensional code.

18. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
obtaining an image of a physical environment;
determining a portion of the image comprising a shape, wherein the shape is one of a plurality of shapes having common structural characteristics;
assessing a blur of the portion of the image, wherein assessing the blur comprises determining a blur value corresponding to the interpretability of the shape in the image; and
in accordance with assessing the blur of the portion of the image, interpreting the portion of the image to interpret the shape.

19. The system of claim 18, wherein assessing the blur of the image comprises using a machine learning model, wherein the machine learning model is trained to assess blur of images depicting the plurality of shapes using target blur metrics determined based on spatial frequency or statistical analysis.

20. A non-transitory computer-readable storage medium, storing program instructions computer-executable on a computer to perform operations comprising:
obtaining an image of a physical environment;
determining a portion of the image comprising a shape, wherein the shape is one of a plurality of shapes having common structural characteristics;
assessing a blur of the portion of the image, wherein assessing the blur comprises determining a blur value corresponding to the interpretability of the shape in the image;
and
in accordance with assessing the blur of the portion of the image, interpreting the portion of the image to interpret the shape.

* * * * *